United States Patent [19]

Snyder et al.

[11] 4,075,603
[45] Feb. 21, 1978

[54] APPARATUS AND METHOD FOR INDICATING CONDITION OF A ROTATING BODY

[75] Inventors: Daniel S. Snyder, Norwalk; Steven O. Luzsicza, Huron, both of Ohio

[73] Assignee: Gould Inc., Rolling Meadows, Ill.

[21] Appl. No.: 728,928

[22] Filed: Oct. 4, 1976

[51] Int. Cl.² ............................................. B60C 23/04
[52] U.S. Cl. .................................... 340/58; 340/224; 200/61.25
[58] Field of Search ............... 340/58, 224; 200/61.23, 200/61.22, 61.25; 325/111, 117

[56] References Cited

U.S. PATENT DOCUMENTS

| | | | |
|---|---|---|---|
| 3,092,806 | 6/1963 | Field | 340/58 |
| 3,223,969 | 12/1965 | Course | 340/58 |
| 3,760,351 | 9/1973 | Thomas | 340/58 |
| 3,950,726 | 4/1976 | Fujikawa et al. | 340/58 |

Primary Examiner—Alvin H. Waring
Attorney, Agent, or Firm—Russell E. Baumann; Edward E. Sachs

[57] ABSTRACT

Apparatus and method particularly adapted for detecting over and/or under inflated conditions in a wheel structure of the type comprised of a pneumatic tire mounted on a wheel rim. A generator unit is mounted to the wheel generally coaxial of the axis of wheel rotation and is constructed such that the generator rotor is operably journalled within the generator stator in a manner facilitating rotation of the rotor independently of the remainder of the generator unit and wheel itself. One side of the rotor is weighted so that as the wheel and generator unit are rotated, the rotor disposition remains generally stationary due to the influence of gravity forces on the weighted area. The relative rotation thus achieved between stator and rotor causes a voltage to be induced in the stator field winding which is utilized to energize a small radio transmitter mounted on the wheel with the generator unit. Pressure sensing means communicating with the tire controls energization of the transmitter in response to a predetermined tire pressure condition. The transmitted radio signal is then received by a receiving unit spaced remote from the wheel to cause energization of convenient indicating means located in the vehicle to show that the predetermined air pressure condition has been detected.

38 Claims, 6 Drawing Figures

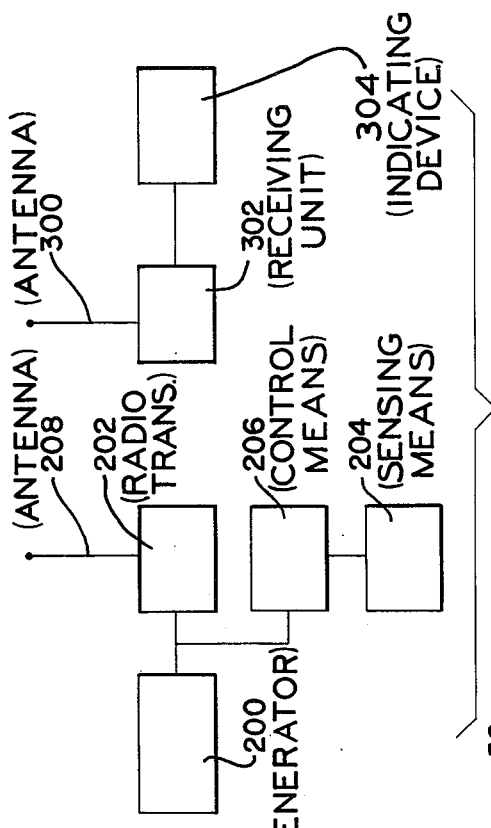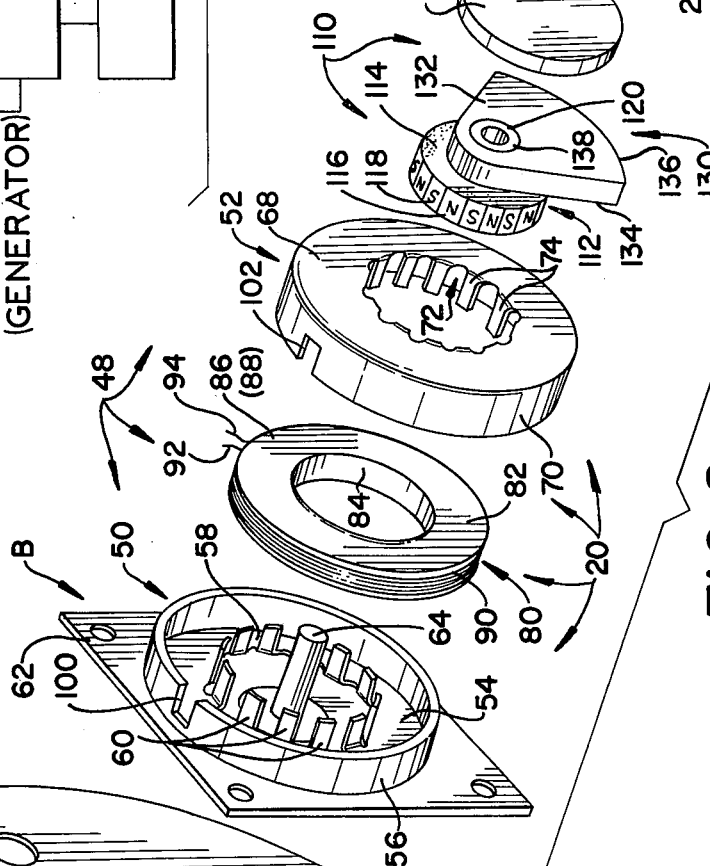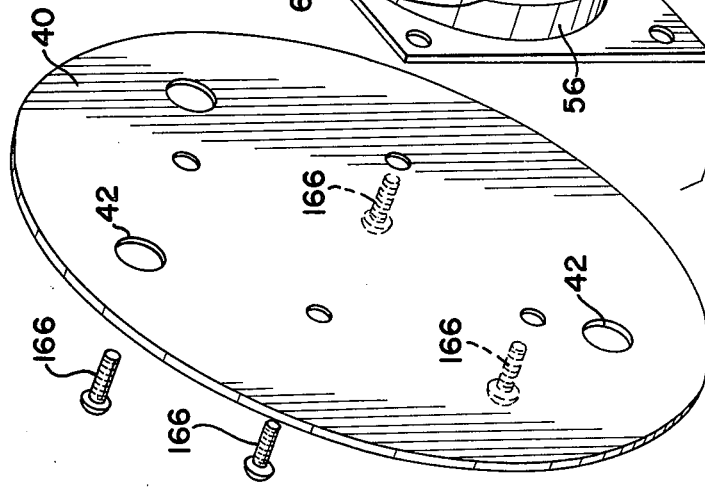
FIG.6
FIG.2

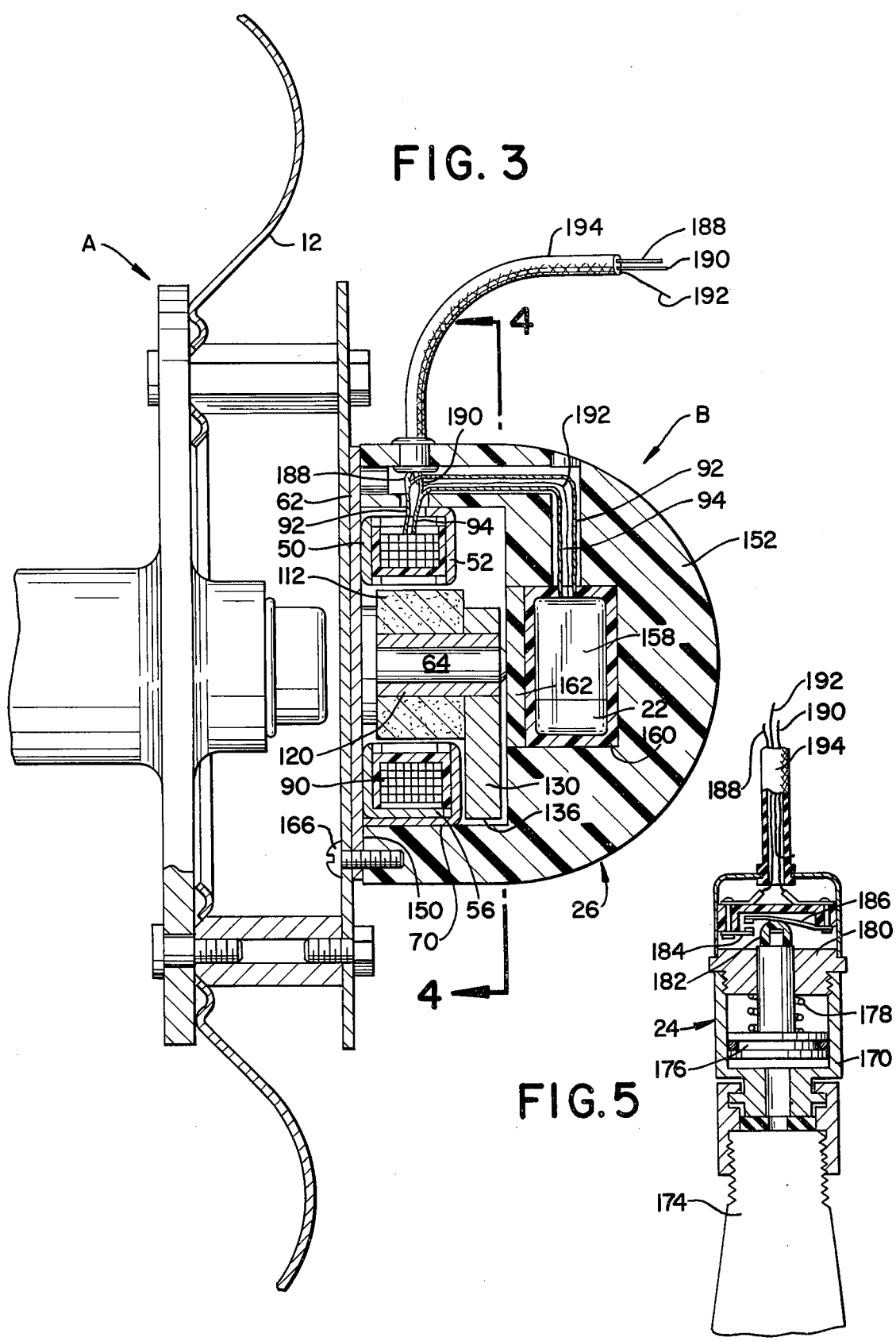

APPARATUS AND METHOD FOR INDICATING CONDITION OF A ROTATING BODY

BACKGROUND OF THE INVENTION

This application pertains to the art of detecting and reporting devices and more particularly to a self-contained device for detecting and reporting some predetermined condition in a rotating body.

The invention is particularly applicable to detecting over and/or under inflated conditions in pneumatic vehicle tires and will be described with particular reference thereto. However, it should be appreciated by those skilled in the art that the invention has far broader applications and may be utilized in many other environments where it is desired to detect and report or indicate some predetermined condition in any rotating body.

Both over and under inflated conditions for pneumatic tires is a cause for excessive tire wear resulting in premature tire failure. Moreover, such under and/or over inflated tire conditions can have an adverse affect on the efficiency of operation of the vehicle as to both vehicle performance or handling as well as vehicle gas mileage. Since such conditions and results have been well known for quite some time, there have been many attempts to develop and provide means for automatically detecting and reporting under and/or over inflation. Recently, development efforts for a practical and inexpensive device have become more concentrated due to the rise in fuel and tire costs as well as vehicle operation costs in general.

While there have been quite a number of prior devices developed and utilized for detecting tire inflation conditions, all of these prior devices have had structural or operational shortcomings rendering them undesirable or impractical for widespread use. While the specific prior devices have been many and varied, most have required special wiring and the like extending from the wheel assemblies to the vehicle chassis and then through the vehicle body to the instrument panel. Such wiring adds undesired costs to the system and, moreover, is extremely difficult and time consuming to install. Such installation time is particularly important when considered on the basis of installing the devices during original vehicle assembly for making them a part of the original vehicle equipment. Further, the necessary special wiring and associated equipment extending between the wheels and chassis are such that they are susceptible to damage or breakage from road materials, weathering and the like encountered during normal vehicle use.

There have also been some prior attempts at developing self-contained detector apparatus in an effort to eliminate the necessity for wiring and the like between the wheels and chassis, but these prior attempts still have not proved totally successful and effective. Specifically, these prior self-contained units have utilized small signal emitters such as a radio transmitter disposed at each wheel. These emitters transmit a signal such as a radio signal in response to some predetermined inflation condition detected in the tire by sensing means. The signal is then received in the vehicle and utilized to energize a warning indicator or light to advise the vehicle operator that an over or under inflated tire condition is present.

While generally overcoming the wiring problems, the means employed for powering the emitters has thus far proved to be unacceptable for practical widespread vehicle application. Typically, these power means have comprised small batteries associated with each wheel or other, rather exotic and complex circuitry. Batteries must, of course, be periodically replaced as their useful life expires and it is impossible to precisely determine the extent of this useful life as it will vary between individual batteries and between individual manufacturers thereof. Moreover, it has been generally found that many owners are extremely lax with regard to all periodic vehicle maintenance including even such basic items as oil and lubrication. As a result, owners would also simply forget or not take the time to properly check, maintain and replace these small batteries. As a result, this type of self-contained detector would often be inoperative and, therefore, of no practical value or use. The other, rather exotic and complex circuitry had the disadvantage of being costly and subject to damage or destruction during normal vehicle use.

Still another disadvantage with prior tire inflation detecting and reporting devices or systems was that their effectiveness depended to a great degree on the rotational speed of the wheel itself. This fact was due to their very design and construction such that the devices were really only effective at elevated vehicle speeds and did not properly operate at normal city driving speeds. Moreover, many of the prior devices were only uni-directional and thus were only operative in one direction of rotation. Accordingly, such devices were limited to mounting on one side or the other of a vehicle.

A still further problem with the prior devices of this general type has been in the necessity for providing operative communication between stationary and rotating components. Because the devices are generally electrically operated, prior devices found it necessary to include slip ring structures to operably interconnect the various components and such structures were found to be susceptible to damage or the like necessitating repair and/or replacement.

The present invention contemplates new and improved apparatus and method which overcomes all of the above referred to problems and others and provides apparatus and method for indicating the condition of a rotating body which are simple in design, economical to manufacture and install, which require a minimum of component parts moving relative to each other during operation, which are self-contained and do not require outside or replaceable energy sources and which are readily adapted to use for any number of detecting functions in a number of environments having an associated rotating body.

BRIEF DESCRIPTION OF THE INVENTION

In accordance with the present invention, there is provided a self-contained device for indicating some predetermined condition in a rotating body. This device is comprised of a generator unit adapted to be mounted for rotation with the rotating body about the axis of body rotation and having a housing member, a stator component including an associated field winding and a rotor component with the stator and rotor components disposed in the housing in spaced apart operative communication with each other. One of the stator and rotor components is disposed in the housing so as to be independently rotatable therein with the other of the stator and rotor components being fixedly mounted to the housing. The one component includes means for maintaining it in a generally stationary disposition as the housing and body are rotated about the body axis thus obtaining relative rotation between the stator and rotor. This relative rotation induces a voltage in the stator field winding with the voltage then being employed to energize an electrically operated member associated with the device.

In accordance with another aspect of the present invention, means are also provided for selectively controlling the electrically operated member in response to a predetermined condition in the rotating body.

In accordance with another aspect of the present invention, the one component comprises the rotor which is rotatably journalled within the housing. The journalled area is disposed to rotate about the body axis when the device is mounted thereon and the means for maintaining the one component in a generally stationary disposition comprises a weighted area on the rotor concentrated on one side of the journalled area.

In accordance with still another aspect of the present invention, the electrically operated member comprises a radio transmitter and the device further includes sensing means for sensing a predetermined condition in the rotating body, operation of the transmitter being controlled by the sensing of such a condition.

In accordance with a more specific aspect of the present invention, the device is adapted to be generally coaxially mounted on a vehicle rim and pneumatic tire assembly for detecting and indicating under and/or over inflated conditions of the tire.

According to a still further aspect of the present invention, there is provided a method of generating a voltage from rotation of a body about its axis for purposes of supplying electrical energy to an operating member. The method comprises the steps of mounting a generator to the body for rotation about the body axis in a manner such that one of the generator stator and rotor components is independently rotatable of the other generator components, providing means for maintaining the one component in a generally stationary disposition as the body and other generator components are rotated about the body axis; rotating the body and other generator components about the body axis thereby obtaining relative rotation between the stator and rotor for inducing a voltage in the stator field winding; and, connecting the field winding to an operating member for purposes of energizing the member.

According to still another aspect of the present invention, the method further includes the step of selectively controlling the voltage to the operating member in response to a predetermined condition in the rotating body itself.

In accordance with yet a further more limited aspect of the present invention, the rotating body is comprised of a vehicle rim and pneumatic tire assembly and the method includes the step of providing means for continuously monitoring the tire air pressure for energizing the operating member when the tire pressure reaches some predetermined limit.

The principal object of the present invention is the provision of a new apparatus and method for indicating a condition in a rotating body.

Another object of the present invention is the provision of apparatus and method for indicating a condition in a rotating body which are simple in design, construction and installation.

Another object of the present invention is the provision of fully self-contained apparatus and method for indicating a condition in a rotating body.

Still another object of the present invention is the provision of apparatus and method for indicating a condition in a rotating body which are readily adapted to use on many different types of rotating bodies in many different environments.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 2 is an exploded view of the apparatus of the subject invention shown in partial cross-section for ease of illustration;

FIG. 3 is a cross-sectional view taken along lines 3—3 of FIG. 1;

FIG. 5 is a generally schematic view showing a pressure sensing device used to monitor tire pressure when using the new apparatus and method; and, FIG. 6 is a generally schematic view showing the overall preferred operational arrangement for the new apparatus and method.

DESCRIPTION OF THE PREFERRED EMBODIMENT

Figure 1:
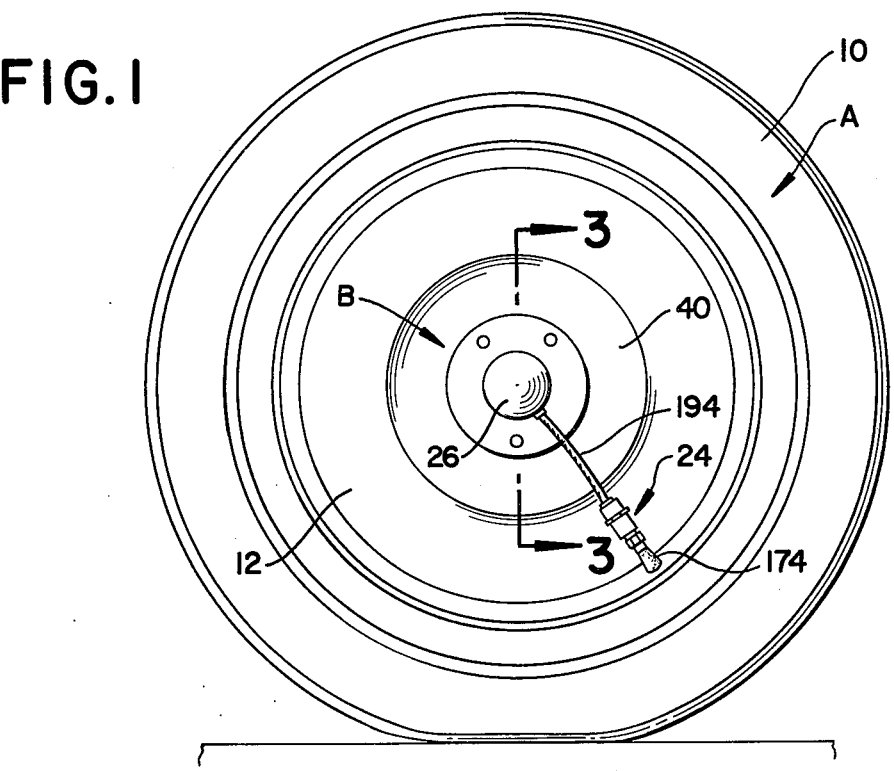
FIG. 1 is a side elevational view of a conventional vehicle wheel assembly having the apparatus of the present invention installed thereon.

Referring now to the drawings wherein the showings are for purposes of illustrating the preferred embodiment of the invention only and not for purposes of limiting same, the FIGURES show a vehicle wheel A and an indicating device B. While the preferred use of the device and method described in detail hereinafter are for purposes of detecting and indicating under and/or over inflation of vehicle tires, the concepts of the invention are deemed equally useful and applicable to use with other rotating bodies for detecting and/or indicating purposes.

More particularly and with reference to FIG. 1, the vehicle wheel is comprised of a conventional pneumatic tire 10 mounted on a conventional wheel rim 12. The rim itself has a central mounting opening (not shown) and a plurality of lug bolt receiving openings (not shown) spaced around the central opening for mounting the wheel to a vehicle as is well known. With reference to both FIGS. 1 and 2, the indicating device is generally comprised of a generator unit 20, a radio transmitter 22, a pressure sensor 24 and a housing 26. The specific details of these components and the cooperation therebetween will be described in greater detail hereinafter. It will be appreciated that one indicating device B is desirably mounted to each vehicle wheel so that a description thereof with reference to one wheel is equally applicable to the other wheels.

In the structural arrangement shown in the drawings and with particular reference to FIG. 2, indicating device B is mounted on a flat mounting plate 40 which, in turn, is mounted on rim 12. For mounting purposes, plate 40 includes a plurality of mounting openings adapted to register with the conventional lug bolt receiving openings in the rim. It has been found that three such openings will suffice for mounting the device to the wheel and those lug bolts involved may have extensions easily added thereto to facilitate mounting. Plate 40 may be conveniently made from sheet steel and has a circular configuration in order that no significant imbalance will be added to the wheel when the device is installed thereon. While plate 40 is utilized in the embodiment of the invention shown in the drawings, other types and configurations of mounting means may also be advantageously employed without departing from the intent or scope of the present invention.

With continued reference to FIG. 2, generator 20 includes a stator component 48 defined by first and second annular stator cups 50, 52 with both cups having generally U-shaped transverse cross-sections. First cup 50 is comprised of a base 54 having parallel outer and inner peripheral walls 56, 58 upstanding therefrom. Inner wall 58 itself is defined by a plurality of spaced apart tines 60 which act to define poles for the generator stator structure as will become apparent hereinafter. First cup 50 is conveniently affixed at base 54 to a base plate 62 which is utilized for assembly purposes as will also become apparent hereinafter. Extending outwardly from this base plate coaxial with cup 50 and generally parallel to tines 60 is an elongated mounting or bearing shaft 64. The length of this shaft is somewhat greater than the length of both the individual tines and the width of outer peripheral wall 56 for reasons which will become apparent hereinafter.

Second annular stator cup 52 is comprised of a base 68 and outer and inner peripheral walls 70, 72 upstanding therefrom. The inner peripheral wall is defined by a plurality of spaced apart tines 74 substantially similar to tines 60 and which also act to define stator poles. Cups 50, 52 are cooperatively dimensioned such that second cup 52 may be received over first cup 50 with the outer peripheral wall 70 disposed over outer peripheral wall 56 to thus form a hollow donut-like configuration. Tines 60, 74 are alternately received between each other in a manner so as to form axial stator poles about the inside diameter of stator 48. While any number of individual tines and/or other pole arrangements could be utilized without departing from the intent or scope of the present invention, 12 tines 60 and 12 tines 74 alternating with each other to yield a 24 double pole stator structure are contemplated in the preferred embodiment. Stator cups 50, 52 may be conveniently formed from sheet metal by using conventional sheet metal stamping and forming techniques.

Disposed in the annular chamber defined between stator cups 50, 52 is a stator field coil structure generally designated 80. This structure is comprised of an annular coil retainer 82 preferably constructed from a plastic material having a cylindrical center core 84 and spaced apart radially extending side walls 86, 88 disposed at the opposite ends thereof. The inner diameter of core 84 is only slightly larger than the inner diameter of annular stator cups 50, 52 in order that it will be in a close spaced relationship with the stator poles defined by tines 60, 74. A stator field coil 90 is comprised of a wound copper wire induction coil disposed circumferentially around coil retainer 82 and has leads 92, 94 extending outwardly thereof. To accommodate these leads, outer peripheral wall 56 of first stator cup 50 includes an opening 100 and outer peripheral wall 70 of second stator cup 52 includes an opening 102. These openings are placed in registry with each other during stator assembly to provide an opening facilitating the passing of leads 92, 94 outwardly of the annular donut-shaped configuration of stator 48.

Figure 4:
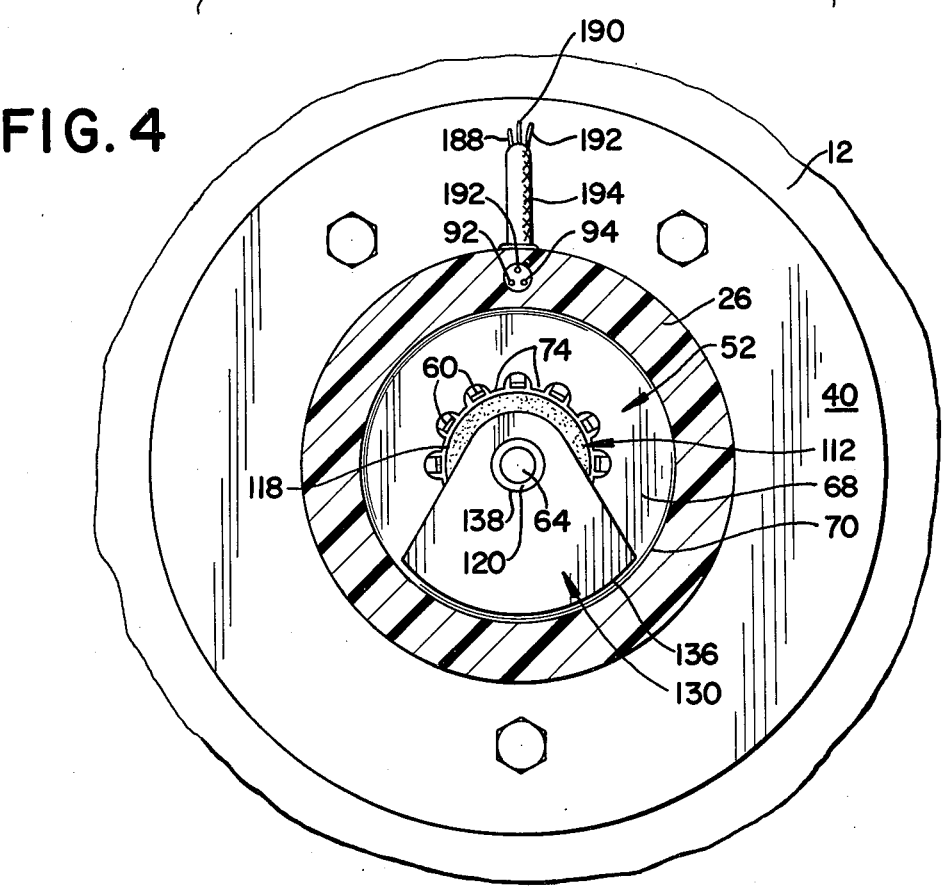
FIG. 4 is a cross-sectional view taken along lines 4—4 of FIG. 3.

As best shown in FIGS. 2, 3 and 4 the rotor component for generator unit 20 is generally designated 110 and, in the preferred embodiment, is comprised of a generally cylindrical permanent magnet member 112 having opposed end faces 114, 116 and an outer peripheral surface 118. A cylindrical bushing or bearing member 120 constructed from conventional bushing or bearing material is closely and fixedly received through a center opening (not shown) in magnetic member 112. One end of this bushing or bearing is disposed generally flush with face 116 with the length of the bushing or bearing being greater than the thickness of magnet member 112 and extending outwardly thereof from face 114. This bearing is dimensioned and adapted to be slidably received over mounting or bearing shaft 64 in order that rotor 110 may be freely and independently rotated therearound for reasons which will be more fully appreciated hereinafter. Circular magnet member 112 is dimensioned such that its outside diameter is slightly less than the inner diameter of first and second stator cups 50, 52 so that there is an air gap provided therebetween and in order that there may be free movement between the rotor and stator as in other types of electrical machines.

Magnet member 112 may be constructed from any number of materials, however, in the preferred embodiment of the invention, it is constructed from an initially unmagnetized composition material and subsequently magnetized by conventional means so that at least outer peripheral surface 118 has a plurality of axially extending poles of alternating polarity disposed therearound. While any number of poles could be advantageously employed without departing from the intent or scope of the present invention, a total of 12 poles alternating in polarity are contemplated in the preferred embodiment here under discussion. The specifics of the composition material employed for member 112 and the means for permanently magnetizing at least outer surface 118 are known in the art and do not form a part of the present invention.

Also forming a part of rotor component 110 is a pendulum member generally designated 130. This pendulum has a generally pie-shaped configuration with outer and inner faces 132, 134 and a radiused outer edge 136. Pendulum 130 also includes an opening 138 adjacent the top or inner edge thereof in order that it may be closely and fixedly received over bushing or bearing member 120 with face 134 thereof in an abutting relationship with face 114 of magnet member 112. Member 120 has a length such that the other end thereof is generally flush with face 132. As best shown in FIGS. 3 and 4, the radius of the pendulum from opening 134 to outer edge 136 is generally equal to the outside radius of first and second stator cups 50, 52.

For reasons which will be described in greater detail hereinafter with regard to device operation, pendulum 130 acts to retain rotor component 110 in a generally stationary position relative to the rest of the indicating device B components and vehicle wheel A when they are rotated generally about the vehicle wheel axis. In the preferred arrangement here under discussion, the pendulum is constructed from zinc by a die casting process. While other materials and processes could also be utilized, a non-ferrous material is most preferred. Also, this material is preferably fairly dense in order to accommodate the function of the pendulum in retaining the rotor component generally stationary relative to the rest of device B as the wheel assembly is rotated about its axis.

With particular reference to FIGS. 2 and 3, housing 26 is shown as having an inner end 150 and an outer end 152. Extending inwardly from the inner end is a first cavity generally designated 154 and extending inwardly from the inner end of the first cavity is a second, smaller cavity generally designated 156. Radio transmitter 22 and appropriate circuitry therefor schematically shown as 158 are received in second cavity 156 and conveniently retained therein by conventional potting material designated 160. The potting material may comprise a silicon plastic or other conventionally used potting materials. The specifics of circuitry 158 and/or radio transmitter 22 do not form a specific part of the present invention and are not disclosed in detail inasmuch as many types of already known circuits and transmitters could be utilized while practicing the broadest concepts of the present invention. Coil leads 92, 94 are conveniently passed from copper field coil 90 of field coil structure 80 through an internal channel or passageway in housing 26 into operative communication with circuitry 158 for operating transmitter 22. A cap or cover 162 is included as part of housing 26 and is adapted to be closely received in the entrance area to second cavity 156 against potting material 160. The thickness of this cap or cover and the depth of potting material 160 are such that the cap or cover presents a flat bottom wall for first cavity 154.

As best shown in FIG. 3, generator assembly 20 comprised of stator and rotor components 48, 110 is received in first cavity 154. The rotor is received on mounting or bearing shaft 64 and the length of the shaft is such that the outermost end thereof is closely spaced to or engages that portion of flat bottom wall 164 of first cavity 154 defined by cap or cover 162. The dimensional relationship between these components is also such that base plate 62 is received against inner end 150 of housing 26. For assembly purposes, conventional threaded fasteners 166 are passed through flat mounting plate 40 and base plate 62 for threaded engagement into housing 26 from inner end 150 thereof. When assembled, stator and rotor components 48, 110 are coaxially disposed with the housing itself.

It should be here noted that the specific physical configuration of housing 26 could comprise many other alternative arrangements as may be desired and/or necessary to accommodate some particular operational criteria. Moreover, and in the preferred embodiment of the invention, the housing is constructed from a rigid plastic material. The shape of and material used for housing 26 may, however, be varied without in any way departing from the overall intent and scope of the invention.

With particular reference to FIGS. 1 and 5, pressure sensor 24 comprises an air pressure responsive switch or valve 170 for detecting the inflation condition of pneumatic tire 10. As shown in these FIGURES, this switch or valve is conveniently threadedly received on the conventional tire valve stem 174 and includes a plunger or piston arrangement generally designated 176 therein which is movable in response to the tire air pressure. The pressure switch or valve may take any number of different structural configurations, however, the rather simple plunger or piston type of arrangement has been found to provide totally acceptable operational results. The plunger or piston may be biased as by a spring generally designated 178 toward the valve stem with the tire air pressure in certain pressure ranges being sufficient to overcome the biasing force of spring 178 and move the plunger or piston away from the valve stem.

Disposed in operative communication with plunger 176 of valve 170 is a contact switch generally designated 180 in FIG. 5. This switch includes a movable contact head 182 and contacts 184, 186. Leads 188 and 190 are operably affixed at one end to contacts 184, 186 and at the other end to leads 92, 94 in housing 26 as shown in FIGS. 3 and 5. A radio transmitter antenna generally designated 192 is passed from transmitter 22 through housing 26 along leads 92, 94 and 188, 190 in order that the radio signal may be transmitted to an associated receiver. For the protection of both antenna 192 and leads 188, 190, a conventional protective sheath 194 is closely received thereover between generator unit 20 and pressure sensor 24 with the outermost end of the antenna exposed therefrom adjacent contact switch 180.

The arrangement between pressure switch or valve 170, contact switch 180 and circuit 158 is such that energization of the circuit and thus, operation of radio 22, is effectively controlled by pressure sensor 24. That is, when a predetermined tire inflation pressure is sensed by pressure switch 170 causing movement of plunger or piston arrangement 176, contact head 182 of contact switch 180 is also correspondingly moved to open or close circuit 158 at leads 92, 94 extending between the field coil and circuit itself.

Again and in the preferred arrangement shown in the drawings, the controlling function for the radio transmitter is performed by sensing a predetermined air pressure level in tire 10. By way of example, it is contemplated that pressure valve or switch 170 will cause energization of the transmitter when the tire air pressure varies 4 to 5 psi from the precise desired air pressure. The contact switch is designed to open the shut circuit between the field coil and radio transmitter when this air pressure is within predefined acceptable limits and to close the circuit when the air pressure is outside of these defined limits. The preferred arrangement here under discussion is designed to detect under inflation, however, pressure switch or valve 170 may easily be designed or modified to detect over inflated conditions or both under and over inflated conditions simultaneously. Moreover, many other and alternative pressure switch and/or contact switch designs other than the arrangement generally shown in FIG. 5 may be advantageously employed without in any way departing from the intent and scope of the present invention. For example, diaphragm type pressure switches could easily be used. Further, the circuitry between sensing device 24 and radio transmitter 22 may be varied as necessary and/or desired to accomplish any special indicating circumstances present for a particular device application.

In operation and with particular reference to FIGS. 1, 3 and 4, housing 26 with the associated components described above is mounted on rim 12 generally coaxial therewith with pressure sensor 24 operably communicating with tire 10. While it is preferred that housing be closely coaxially mounted on rim 12, the device and method of the subject invention will also function if this mounting is not precisely coaxial. Such a situation could well arise simply due to component tolerances and the like. Because of the permissible latitude from a precise coaxial installation, the device may be mounted to a vehicle wheel assembly without having to use precise instrumentation and measuring equipment during installation. Further, the device component tolerances need not be precisely held during manufacture which would otherwise add undesired manufacturing costs. If the device is mounted too far from a coaxial disposition with the rotating body, centripital force will cause an interruption in operation. The amount of permissible deviation from a coaxial installation which will allow the generator to satisfactorily function is dependent upon pendulum length, pendulum mass, diameter of the rotating body, rotational speed of the body and so on. These latter two specific criteria become somewhat more important when the generator and method are adapted to use in rotating body environments other than vehicle wheel assemblies.

As best shown in FIG. 4, cylindrical permanent magnet member 112 of the rotor component is received inside first and second annular stator cups 50, 52 in a close spaced relationship with the stator poles defined by tines 60, 74. Rotor component 110 is received on mounting or bearing shaft 64 in a manner such that it is free to rotate generally about the wheel axis relative to the remainder of the indicating device and wheel. Because of the shape of pendulum 130 and its disposition on rotor component 110, gravitational forces will cause the rotor to remain generally stationary by allowing it to rotate about shaft 64 as the vehicle wheel and the rest of the indicating device are rotated. Because member 112 comprises a permanent magnet having a plurality of axial poles of alternating polarity disposed around at least outer peripheral surface 118 and further because these poles are in close spaced proximity to the poles on the stator component defined by tines 60, 74, the resultant relative rotation between the rotor and stator components causes a voltage to be induced in copper wire induction coil 90 of field coil structure 80. As the generation of this voltage is substantially identical to other, more conventional types of generators from an abstract technological point of view, further elaboration on the specifics thereof is deemed unnecessary. It should be noted, however, that this structural arrangement provided by the subject invention eliminates the need for slip rings and other sensitive electrical connections which could be damaged during device usage. Further, the overall general construction of the subject invention provides a bi-directional device, i.e., a voltage will be induced in coil 90 in both directions of relative rotation between the stator and rotor components. As a result, the generator unit may be affixed to the wheel assemblies on either side of a vehicle.

The voltage induced in copper wire coil 90 is passed by leads 92, 94 directly to circuitry 158 for energizing radio transmitter 22. The circuitry and radio are constructed to be compatible with the operational characteristics of the generator itself. With the arrangement just described above, the radio transmitter would be energized to operate whenever the wheel is in movement or rotating about its axis. Normally, however, it is desired to only have the radio transmitter transmit at such times that an out of order condition is detected by pressure sensor 24.

Accordingly and in the preferred embodiment here under discussion, contact switch 180 is designed such that it will cause circuit 158 for radio 22 to be opened or shunted through leads 188, 190 whenever an acceptable tire inflation condition is being detected by pressure switch or valve 170 and will only allow the radio circuit to be closed or become operative at such time that an out of order or unacceptable tire pressure condition is detected. Again, this result is simply obtained by using a mechanical pressure switch 170 which includes a plunger or piston arrangement responsive to tire pressure for activating and deactivating the contact switch. Whenever an out of order tire inflation condition is detected by the sensor and the radio transmitter circuit thus closed, radio transmitter 22 is energized through its circuitry to emit a radio signal through antenna 192.

As to the transmitter itself, a higher frequency signal such as a frequency modulated (FM) signal is preferred in order to eliminate the problems with noise and interference generally associated with lower frequency radio signals. Again, the specifics of radio transmitter 22 itself, as well as the attendant circuitry therefor do not form a part of the present invention. Many alternative circuitry arrangements could be equally and adequately employed with indicating device B hereinabove described in detail and, in fact, means other than a radio transmitter could also be employed to indicate that an out of order tire pressure condition exists in the wheel.

FIG. 6 shows a schematic view of the basic components of the subject invention as they relate to each other and to a receiver disposed in the vehicle itself. New numerals have been employed for the components schematically shown for ease of illustration and description. In this FIGURE, generator 200 generates a voltage during rotation of the vehicle wheel and this voltage is then used to operate radio transmitter 202. Sensing means 204 is connected to the tire for purposes of continuously monitoring tire pressure conditions. When the air pressure reaches a predetermined unacceptable value, it energizes control means 206 which closes the radio transmitter circuit. When the circuit is closed, transmitter 202 is energized to transmit a radio signal through antenna 208.

The signal emitted from antenna 208 is then picked up by antenna 300 in a receiving unit 302 located in the vehicle. That signal is then decoded or otherwise used to energize a warning light or some other device in or adjacent the vehicle instrument panel for indicating that a tire has a pressure which is outside of the predetermined limits. The specifics of receiver 302 and indicating device 304 do not form a part of the present invention and, therefore, are not described in greater detail herein. Such receiving devices are, however, known in the art and generally compatible with conventional radio receiving technology.

In addition to the various above noted modifications which may be incorporated when practicing the concepts of the subject invention, it should also be noted that means other than plate 40 to which the generator unit 20 and radio transmitter 22 are affixed may be used for mounting them to a vehicle wheel. For example, it may be entirely possible to redesign the shape of housing 26 so that it could be press fitted on the vehicle axle at the conventional grease cup area. Moreover, and by way of example of size, the entire generator and radio transmitter package can be made such that housing 26 would be no more than 2" in width or diameter and approximately ¾" thick. Further, it is entirely possible and within the scope of this invention to include pressure sensor 24 in the housing itself and/or to connect the pressure sensor to monitor tire pressure at areas other than the conventional valve stem area.

While the present invention is deemed particularly applicable to use in detecting and indicating under and/or over inflated tire pressures for conventional vehicle wheels, it may be readily adapted and used for other applications whenever it is desired to continuously monitor some condition in a rotating body and then provide an indicator or warning when this condition reaches some predetermined level. It is again emphasized that the generator device and method of the subject invention need not be precisely coaxially mounted to the axis of rotation for the rotating body. Indeed and in some alternative environments of use for the invention, it may be advantageous and/or desirable for one reason or another to mount the generator device in an off-center position on the body. The amount or degree of off-center positioning will, again, depend upon pendulum length, pendulum mass, diameter of the rotating body, rotational speed of the body and so on. Moreover, and while the preferred use of the subject invention is for energizing a radio transmitter for transmitting signals to a receiver spaced some distance from the body which is being monitored, it would also be possible to replace the transmitter with other circuitry for performing other types of indicating or working functions. All of these various above noted modifications are deemed to fall within the scope and intent of the present invention.

The invention has been described with reference to the preferred embodiment. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. An indicator device adapted to be mounted relative to a rotatable body for rotation therewith to energize an electrically operated member, said device comprising:
   a generator unit including a housing member having a longitudinal housing axis and including means for mounting said housing to said body in a manner such that said longitudinal housing axis is fixedly disposed generally normal to the plane of said rotatable body, a stator component including an associated field winding and a rotor component with said stator and rotor components disposed in said housing generally coaxial with said housing axis in spaced apart operative communication with each other, one of said stator and rotor components being mounted for independent rotation about said housing axis with the other of said stator and rotor components being stationarily affixed to said housing, said one component including means for maintaining it in a generally stationary disposition when said housing is mounted to a rotatable body and rotated about the axis of said body whereby relative rotation is obtained between said stator and rotor components solely by the influence of rotation of said body with said relative rotation causing a voltage to be induced in said field winding; and, an electrically operated member connected to said field winding and energized by said voltage.

2. The device as defined in claim 1 further including means for selectively controlling said voltage to said operated member in response to a predetermined condition in said rotating body.

3. The device as defined in claim 2 wherein said electrically operated member comprises a radio transmitter.

4. An indicator device adapted to be mounted relative to a rotatable body for rotation therewith to energize an electrically operated member, said device comprising:
   a generator unit including a housing member having a longitudinal housing axis and including means for mounting said housing to said body, a stator component including an associated field winding and a rotor component with said stator and rotor components disposed in said housing generally coaxial with said housing axis in spaced apart operative communication with each other, one of said stator and rotor components being mounted for independent rotation about said housing axis with the other of said stator and rotor components being stationarily affixed to said housing, said one component including a weighted area associated therewith on one side thereof from said housing axis with said weighted area being acted upon by gravity forces so that said one component will remain in a generally stationary position as said rotating body and housing are rotated about said body axis, whereby relative rotation is obtained between said stator and rotor components for causing a voltage to be induced in said field winding; and, an electrically operated member connected to said field winding and energized by said voltage.

5. The device as defined in claim 1 wherein said one component comprises said rotor component, said rotor component being rotatably journalled about said housing axis, said rotor including a plurality of permanent magnetic poles of alternating polarity.

6. The device as defined in claim 5 wherein said rotor component has a generally cylindrical configuration with said rotor poles disposed at least about the outer circumference thereof, said rotor component including means for mounting it for rotation generally coaxial of said housing axis.

7. An indicator device adapted to be mounted relative to a rotatable body for rotation therewith to energize an electrically operated member, said device comprising:
   a generator unit including a housing member having a longitudinal housing axis and including means for mounting said housing to said body, a stator component including an associated field winding and a rotor component with said stator and rotor components disposed in said housing generally coaxial with said housing axis in spaced apart operative communication with each other, said rotor component being rotatably journalled about said housing axis and including a plurality of permanent magnetic poles of alternating polarity and said stator component being stationarily affixed to said housing, said rotor components including a weighted area associated therewith and radially disposed on one side thereof from said housing axis so that gravity will cause said rotor component to remain in a generally stationary position as said rotating body and housing are rotated about said body axis, whereby relative rotation is obtained between said stator and rotor components for causing a voltage to be induced in said field winding; and, an electrically operated member connected to said field winding and energized by said voltage.

8. The device as defined in claim 7 wherein said rotor component is journalled to a mounting shaft in said housing, said weighted area comprising a separate weight member fixedly associated with said rotor component and dimensioned to depend radially outward thereof.

9. The device as defined in claim 5 wherein said other component comprises said stator component defined by a generally annular stator structure fixedly secured to said housing to surround said rotor component, said stator structure having an inner diameter defined by a plurality of axially extending poles disposed at spaced apart intervals therearound, said rotor and stator components being dimensioned such that said stator and rotor poles are in close spaced operative association with each other.

10. The device as defined in claim 9 wherein said field winding surrounds said stator poles circumferentially of said stator structure.

11. The device as defined in claim 9 wherein said electrically operated member is mounted in said housing.

12. The unit as defined in claim 11 wherein said electrically operated member comprises a radio transmitter.

13. The unit as defined in claim 12 further including sensing means for sensing a predetermined condition in said rotating body and means for selectively controlling said voltage to said radio transmitter in response to said sensing means.

14. A device assembly for continuously monitoring and indicating the tire inflation condition of a conventional vehicle wheel assembly comprised of a rim and pneumatic tire, said device comprising:
a generator unit generally coaxially mountable on said wheel assembly and including a housing having a longitudinal housing axis, a stator component including an associated field winding and a rotor component with said rotor and stator components disposed in said housing in operative communication with each other, one of said stator and rotor components being mounted for independent rotation about said housing axis with the other of said stator and rotor components being stationarily affixed to said housing, said one component including means for maintaining it in a fixed position when said housing is generally coaxially mounted to a wheel assembly and rotated about the axis of said assembly whereby relative rotation is obtained between said stator and rotor components with said relative rotation inducing a voltage in said field winding;
an electrically operated indicating member connected to said field winding and energized by said voltage; and,
sensing means adapted to sense the inflation condition for a pneumatic tire on said wheel assembly, said sensing means selectively energizing said indicating member responsive to sensing a predetermined inflation condition.

15. The device as defined in claim 14 further including voltage control means responsive to said sensing means for controlling the voltage flow from said field winding to said indicator member.

16. The device as defined in claim 15 wherein said electrically operated indicating member comprises a radio transmitter.

17. The device as defined in claim 14 wherein said sensing means comprises air pressure sensing means, said indicating member being energized from said field winding only when said sensing means senses a predetermined air pressure in said tire.

18. The device as defined in claim 17 wherein said indicating member comprises a radio transmitter disposed in said device housing.

19. The device as defined in claim 18 further including voltage control means interposed between said field winding and said transmitter for controlling voltage flow to said transmitter in response to said sensing means sensing said predetermined air pressure.

20. The device as defined in claim 14 wherein said one component comprises said rotor component, said rotor component being rotatably journalled about said housing axis, said rotor including a plurality of permanent magnetic poles of alternating polarity.

21. The device as defined in claim 20 wherein said rotor component has a generally cylindrical configuration with said rotor poles disposed at least about the outer circumference thereof, said rotor component including means for generally coaxially mounting it for rotation about said housing axis.

22. The device as defined in claim 20 wherein said maintaining means comprises a weighted area associated with said rotor component and radially disposed on one side thereof from said housing axis so that gravity will cause said rotor component to remain in a substantially stationary position as wheel assembly and housing are rotated about said wheel assembly axis.

23. The device as defined in claim 22 wherein said rotor component is journalled to a mounting shaft in said housing, said weighted area comprising a separate weight member fixedly associated with said rotor component and dimensioned to depend radially outward thereof.

24. The device as defined in claim 20 wherein said other component comprises said stator component defined by a generally annular stator structure fixedly secured to said housing coaxial with said housing axis to surround said rotor component, said stator structure having an inner diameter defined by a plurality of axially extending poles disposed at spaced apart intervals therearound, said rotor and stator components being dimensioned such that said stator and rotor poles are in close spaced operative association with each other.

25. The device as defined in claim 24 wherein said field winding surrounds said stator poles circumferentially of said stator structure.

26. The device as defined in claim 24 wherein said sensing means comprises air pressure sensing means, said indicating member being energized from said field winding only when said sensing means senses a predetermined air pressure in said tire.

27. The device as defined in claim 26 wherein said indicating member comprises a radio transmitter disposed in said device housing.

28. The device as defined in claim 25 further including voltage control means interposed between said field winding and said transmitter for controlling voltage flow to said transmitter in response to said sensing means sensing said predetermined air pressure.

29. A method of energizing an electrically operated member associated with a rotating body, said method comprising the steps of:
mounting a generator unit on said body for rotation therewith about the body axis of rotation, said generator unit including a stator component having a field winding and a rotor component disposed in close spaced operative association with each other, one of said stator and rotor components being mounted for rotation about an axis disposed generally normal to the plane of said rotating body independently of said body and the other of said stator and rotor components, said other component being fixedly mounted to said body;

providing means for maintaining said one component in a generally stationary disposition as said body and said other component are rotated about said body axis;

rotating said body and said other component about said body axis to obtain relative rotation between said stator and rotor for inducing a voltage in said field winding wherein said relative rotation is effected solely through rotation of said body; and, connecting said field winding to said electrically operated member for energizing said member by said induced voltage.

30. The method as defined in claim 29 further including the step of selectively controlling the induced voltage communicated to said operated member in response to a predetermined condition of said body.

31. The method as defined in claim 30 wherein said operated member comprises a radio transmitter and said step of selectively controlling comprises causing said transmitter to be energized for transmitting a radio signal in response to said predetermined condition.

32. The method as defined in claim 29 wherein said one component comprises said rotor component and said other component comprises said stator component, said step of mounting including locating said components coaxially of each other with said component surrounding said rotor component.

33. The method as defined in claim 32 wherein said step of providing comprises including a weighted area on said rotor component on one side of said body axis with gravity forces causing said rotor component to remain generally stationary during rotation of said body and said stator component about said body axis.

34. A method for indicating the inflation condition for a vehicle wheel comprised of a wheel rim and a pneumatic tire, said method comprising the steps of:

fixedly mounting a generator unit on said wheel generally coaxial of the wheel axis;

providing said generator unit with a stator component including a field winding and a rotor component with one of said components being mounted for independent rotation generally coaxially about said wheel axis and the other of said components being fixedly mounted to said unit for rotation therewith about said wheel axis;

obtaining relative rotation between said stator and rotor components generally coaxially of said wheel axis during rotation of said wheel thereby causing a voltage to be induced in said field winding;

connecting said induced voltage to an electrically energized indicating member;

providing sensing means for sensing the inflation condition for said tire; and, causing selective energization of said indicating member in response to the sensing of a predetermined inflation condition by said sensing means.

35. The method as defined in claim 34 wherein said step of causing includes the step of controlling the voltage to said indicating member responsive to said sensing means by controlling means interposed between said sensing means and said indicating means.

36. The method as defined in claim 34 wherein said step of connecting comprises connecting said generated voltage to a radio transmitter with said transmitter transmitting a radio signal in response to said selective energization.

37. The method as defined in claim 34 wherein said step of providing sensing means comprises providing an air pressure sensor communicating with said tire, said sensor causing energization of said indicating means for at least one predetermined limit of tire air pressure.

38. The method as defined in claim 37 wherein said indicating member comprises a radio transmitter and said step of causing comprises energizing said radio transmitter responsive to said air pressure sensor sensing said at least one predetermined limit.

* * * * *